April 17, 1945. F. TURRETTINI 2,373,930
OPTICAL CONTROL APPARATUS
Filed Oct. 27, 1942 6 Sheets-Sheet 1

INVENTOR
FERNAND TURRETTINI,
BY
ATTORNEYS

April 17, 1945.　　　F. TURRETTINI　　　2,373,930
OPTICAL CONTROL APPARATUS
Filed Oct. 27, 1942　　　6 Sheets-Sheet 3
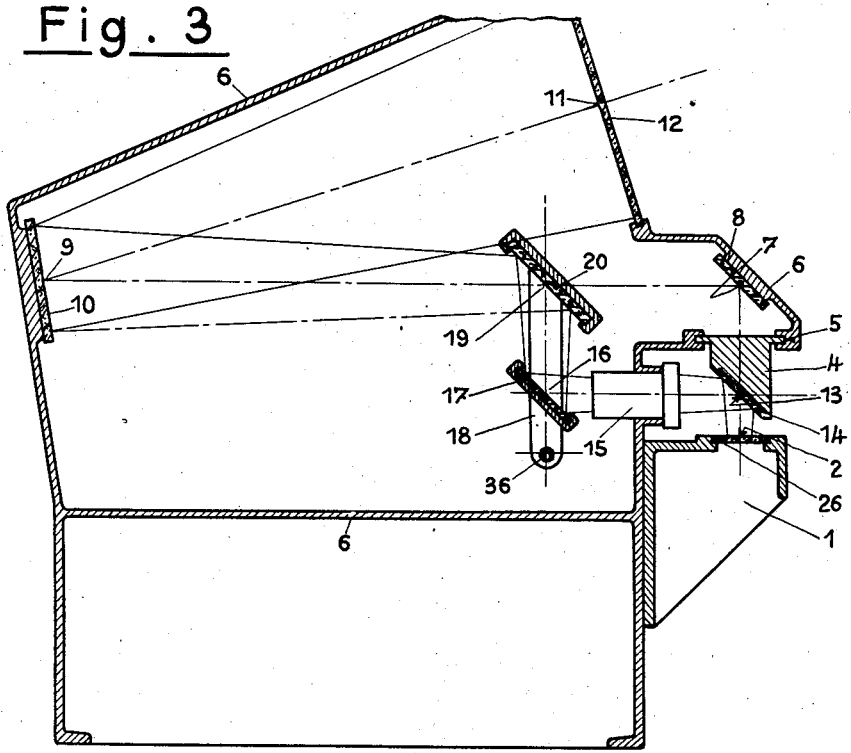
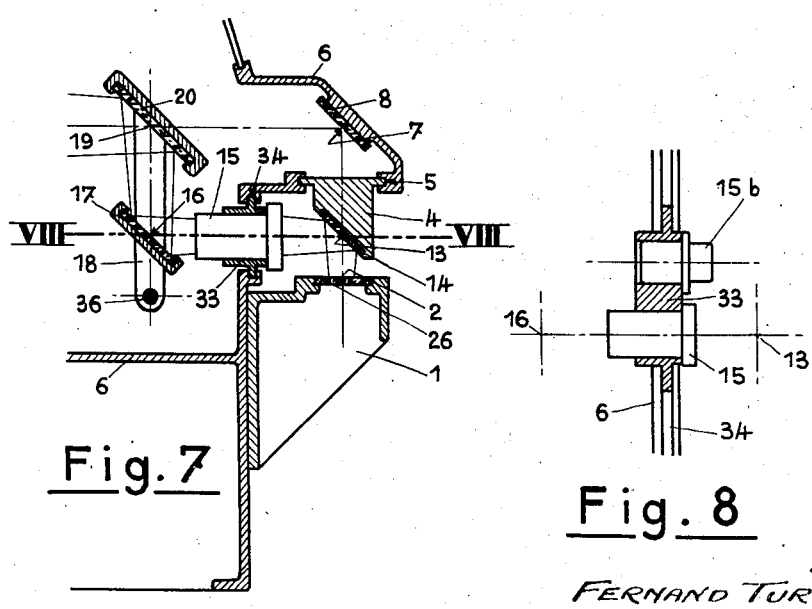
INVENTOR
FERNAND TURRETTINI,

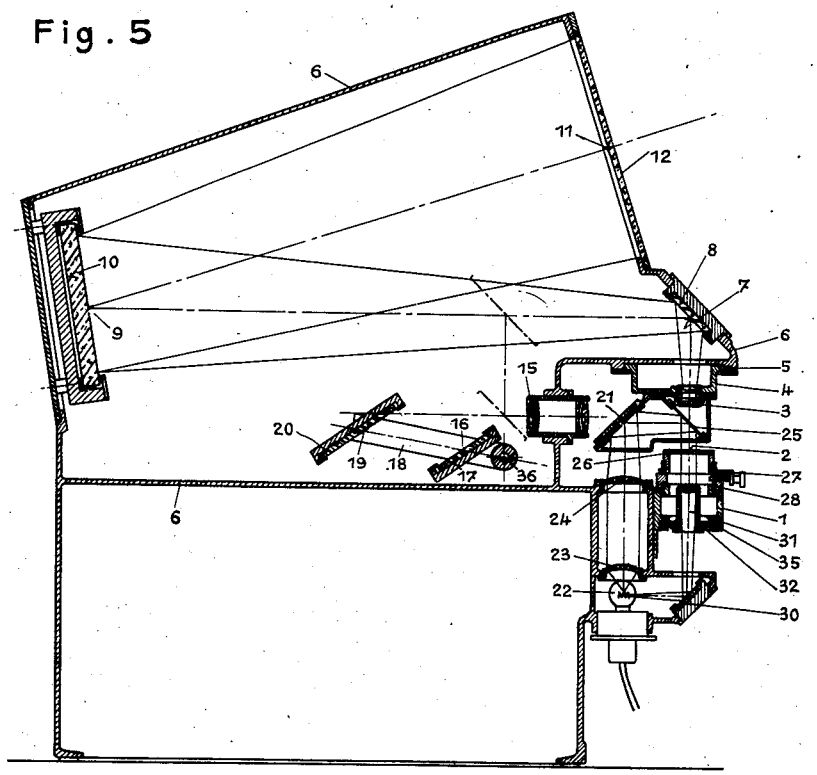

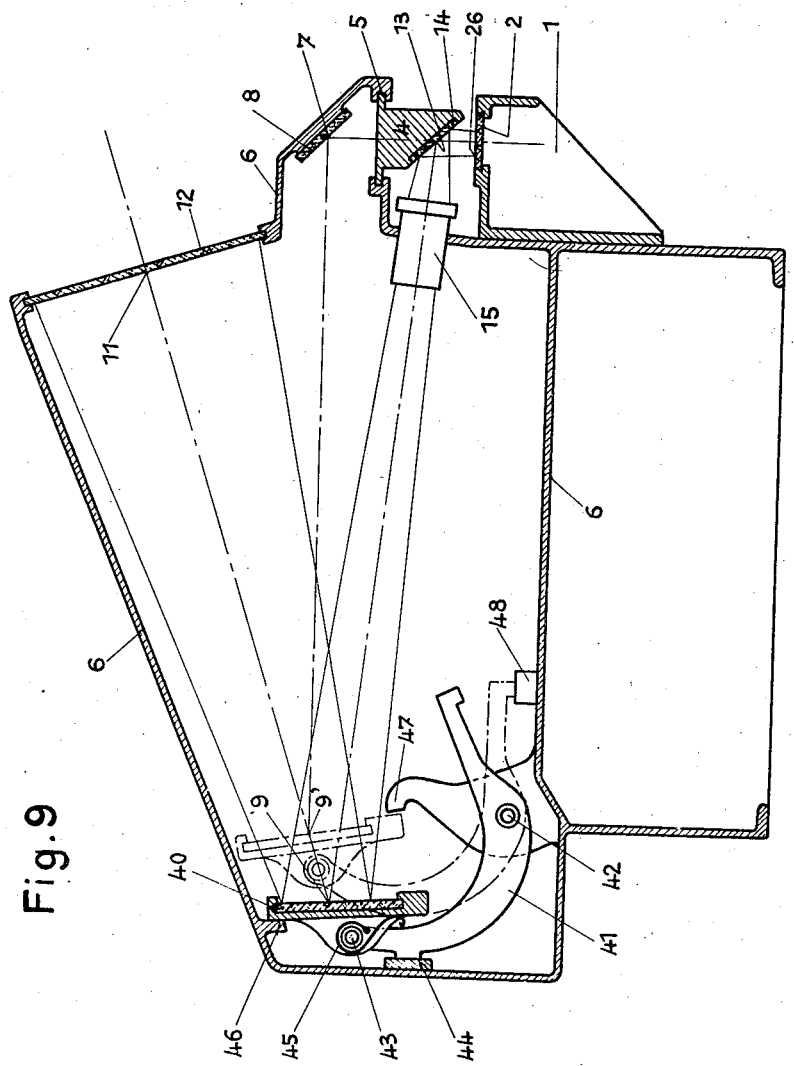

Patented Apr. 17, 1945

2,373,930

UNITED STATES PATENT OFFICE 2,373,930

OPTICAL CONTROL APPARATUS

Fernand Turrettini, Bellevue-Geneva, Switzerland

Application October 27, 1942, Serial No. 463,534
In Switzerland February 5, 1942

8 Claims. (Cl. 88—24)

Optical control apparatus are already known. They generally comprise a projecting camera allowing of varying degrees of magnification and including a slightly inclined observation screen located just in front of the observer, and a horizontal work carrier or table arranged to the rear of the screen. Such an arrangement presents the disadvantage that the observer is separated from the work carrier or table by the full width of the screen which often reaches more than 400 millimeters, so that it is awkward for him to stretch out his hand for properly positioning on the work carrier very small parts or works such for example as such minute parts as are used in watch making. Other known optical control apparatus include a vertical work plane arranged at the foot of a substantially vertical screen, said plane being interposed between the screen and the observer. This last-named type of control apparatus is hardly suitable for controlling such small parts as are used for example in watch making because these must be necessarily laid on a horizontal work carrier, lest they might slip down.

It is an object of the present invention to provide a new or improved optical apparatus wherein the controlling operation is performed by projecting an image on a screen while obviating the aforesaid disadvantages by shortening the distance between the work or object to be examined and the observation screen.

Another object of the invention is to provide a new or improved optical control apparatus as aforesaid having such an arrangement of parts as to permit the operator or observer while looking at the screen on which the work image is optically projected to selectively lay different work on the work carrier without having to alternatively lean down and stand up, thereby diminishing the operator's strain.

Yet another object of the invention is to provide a new optical control apparatus as aforesaid enabling several degrees of magnification of the work being examined to be obtained at will without requiring complicated adjustments, the change over from small magnification to large magnification or conversely being readily effected by the operator in the course of the observing process.

A further object of the invention is to provide a new optical control apparatus as aforesaid composed of a small number of simple and rugged parts so accommodated in an overall casing as to lend themselves to the manufacture of a self contained and compact unit utilisable in laboratories or shops.

With these and such other objects in view as will incidentally appear hereafter, the invention comprises the novel construction, combination and arrangement of parts that will now be described in detail with reference to the accompanying diagrammatic drawings exemplifying embodiments of the same and forming a part of the present disclosure.

In the drawings:

Figure 1 is a sectional view illustrating the general arrangement of a projection apparatus comprising a work carrier or table positioned forwardly of an observation screen and a long frontal distance objective lens, this view being drawn prior to the application of the invention to said apparatus and clearly showing that such an objective calls for a relatively long distance between the work carrier and screen.

Figure 3 is a sectional view similar to Fig. 2 but illustrating the arrangements of the several members when using an objective lens having a small power of magnification, i. e. a long frontal distance.

Figure 5 is a sectional view of a constructional form showing with more details the optical control apparatus diagrammatically represented in Fig. 2, this view also showing the illuminating device and setting forth the use of an objective lens having a high power of magnification.

Figure 7 is a fragmentary sectional view showing a constructional modification.

Figure 8 is a fragmentary sectional view taken on the line VIII—VIII of Fig. 7.

Figure 9 is a view showing another constructional modification.

Like reference characters designate like parts throughout the several views.

As illustrated, the improved optical control apparatus comprises a steeply inclined observation screen 12 and a horizontal work carrier 2 in the form of a small table or shelf arranged not far below the base of the screen so as to be situated within easy reach of the operator. The optical axis shown in dot and dash line must be counter elbowed several times so as to extend at right angles to the work carrier 2 or in other words to run vertically in its first portion and to reach the steeply inclined screen 12 at right angles to the latter.

The apparatus according to the invention permits several degrees of magnification to be obtained. To that effect, it includes objective lenses 3 having a very short frontal distance (of less than 20 millimeters) and other objective lenses 15 having a very long frontal distance (of over 160 millimeters) also objective lenses having frontal distances intermediate to the cited values which would be regarded practically speaking as extreme exemplifications.

It follows that the first elbow of the optical axis must be situated underneath the screen so as not to hinder visibility to at least 300 millimeters off the work carrier and to be situated beyond the small magnification objective which is in itself rather lengthy and cumbersome.

Figure 1:
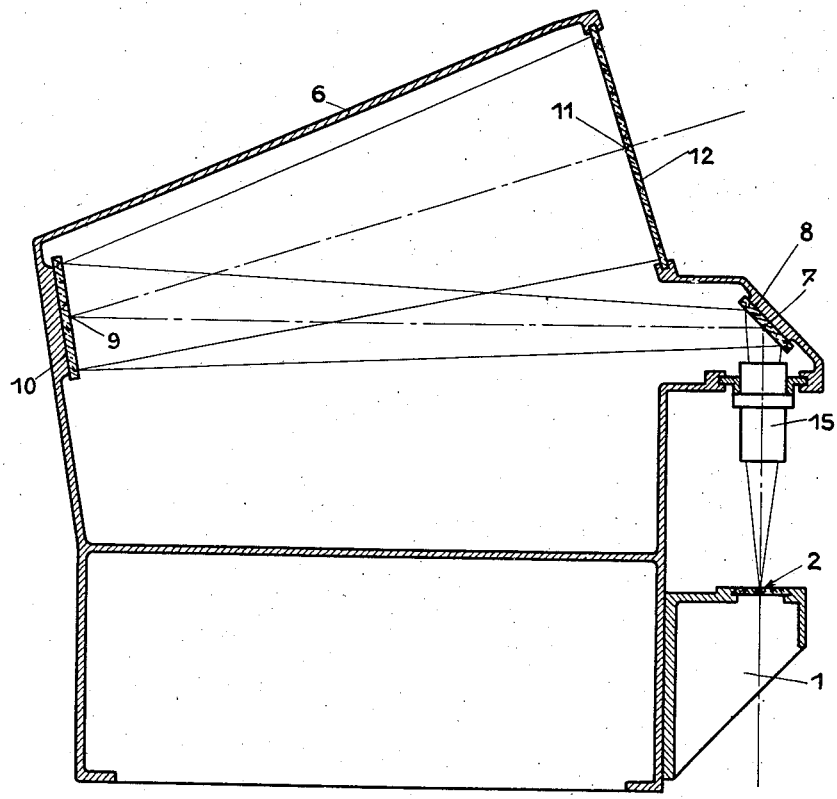

The showing of Fig. 1 will help to conceive the foregoing by clearly bringing out the general arrangement which would be assumed by an optical control apparatus including a projection screen and a work carrier located forwardly of said screen, were it not for the improvements introduced by the present invention. It will be seen from Fig. 1 that such an apparatus would be impractical because the work carrier 2 would have to be situated much lower than the centre of the screen 12 (at least 600 millimeters lower) as otherwise the usual size of the screen and objective lenses would not be properly taken into account. Moreover, the operator then has to lean down for conveniently laying the work on the work carrier 2 and then stand up again each time to bring his eyes adjacent the line extending through the centre of the screen 12 and at right angles thereto. This would entail such frequent changes in the operator's attitude as would in the long run tire him to a state of unfitness.

Figure 2:
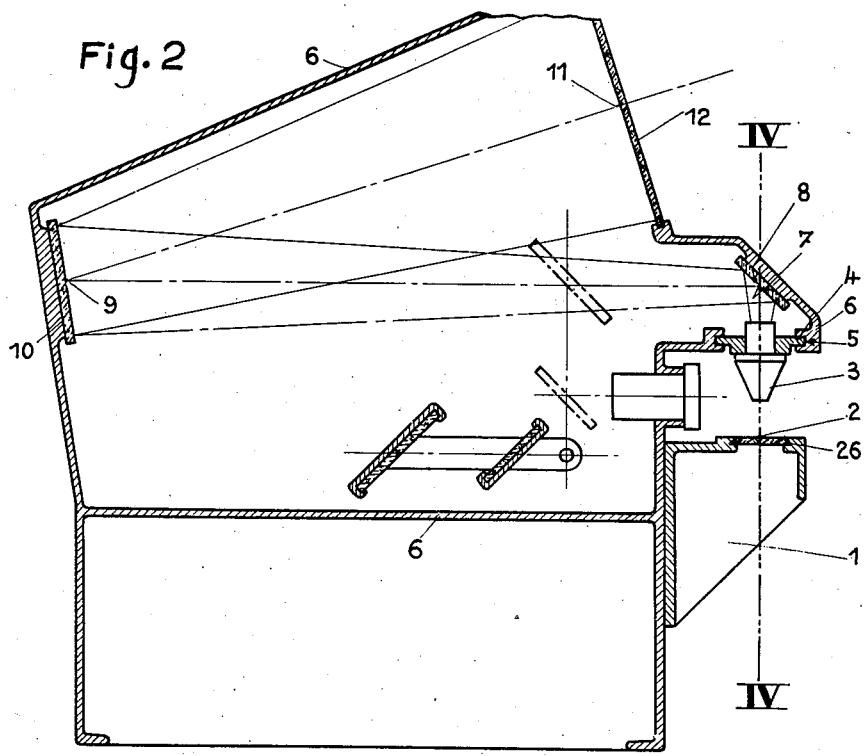
Figure 2 is a sectional view illustrating the arrangement of the several members of which an apparatus according to the invention is made up when using an objective lens having a high power of magnification, i. e. a short frontal distance.

The above-stated difficulties are obviated in the improved optical control apparatus according to the invention which ingeniously provides a remedy. The solution consists as shown in Figs. 2 and 3 in arranging the long frontal distance objective or objectives 15 (hereafter to be called "secondary lens means") horizontally or substantially horizontally and in such a way that one elbow of the optical axis should lie between the same and the work-containing plane, moreover in arranging the short frontal distance objective or objectives 3 (hereafter to be called "primary lens means") vertically and in such a way that the first elbow of the optical axis should lie between the same and the screen 12. This arrangement enables the distance between the screen 12 and the work carrier 2 to be kept down to a much lower value than in the showing of Fig. 1, since only the frontal distances and the overall volume of the high magnification objectives which are of small size must be interposed between the work carrier 2 and the lower end of the screen 12.

In order to enable the centre of either objective to be brought into coincidence with the optical axis, the apparatus further comprises a movable holder 4 (to be hereafter referred to as the "supporting means") on which are secured the short frontal distance objectives 3, and a mirror 14 adapted to be brought into interposition between the work being scrutinized and the long frontal distance objective, independently of the movable holder 4, and having its axis set at an angle to the one of the short frontal distance objectives.

This novel arrangement presents the additional advantage that all the objectives 3 and 15 are situated above the work carrier 2 which is generally transparent, so that when observations in episcopic illumination are effected, there is no parasitic reflection on the surfaces of the glass sheet 26 which forms the centre of the work-carrying table.

The showing of Fig. 2 assumes the hypothesis where the apparatus is used with an objective lens 3 involving a high degree of magnification. 1 is the bracket for the work carrier 2 which is adjustable heightwise responsive to the actuation of means (not shown) which also permit the image on the screen 12 to be properly focussed. The work carrier 2 is actually constituted by the central portion of the glass sheet 26 on which the work is carried. 3 is a large magnification objective secured to the movable holder 4 constituted for example by a slider guided through a runway 5 formed in the casing 6 of the apparatus. 7 is the first elbow of the optical axis reflected rearwardly by a first primary mirror 8 overlying the lens 3.

The optical axis extends to a position 9 whence it is angularly deflected by a second primary mirror 10 and joins up at 11 the centre of the observation screen 12.

The showing of Fig. 3 illustrates the use of the apparatus, assuming a small magnification objective 15 to be utilised. It will be seen from a comparison of this figure with the previous figure that the movable holder 4 has been shifted along its runway 5 so as to cause the optical axis to intersect at a position such as 13 a mirror 14 and to throw said axis back towards the small magnification objective 15 whence said axis is again broken off at 16 by hitting an upper secondary mirror 17 and again broken off at 19 by hitting a lower secondary mirror 20, both mirrors being carried by a support 18 pivoted at 36 so as to be rockable from an eclipsed or inoperative position visible in Fig. 2 over to the operative position shown in Fig. 3. From the point 19, the optical axis passes through the points 9 and 11 as in Fig. 1, the point 19 constantly remaining on the straight line drawn from 7 to 9.

It will be understood that all mirrors can be replaced by prisms, all such optical contrivances being included in the general expression "reflecting means" used in the claims.

As will be readily seen, such an arrangement enables the work carrier or table 2 to be considerably brought nearer to the screen 12 since obviously, were it necessary for the objective 15 to be inserted into the element 2—7 of the optical axis, said element ought to have a length equal to 2—13 plus 13—16.

Figure 4:
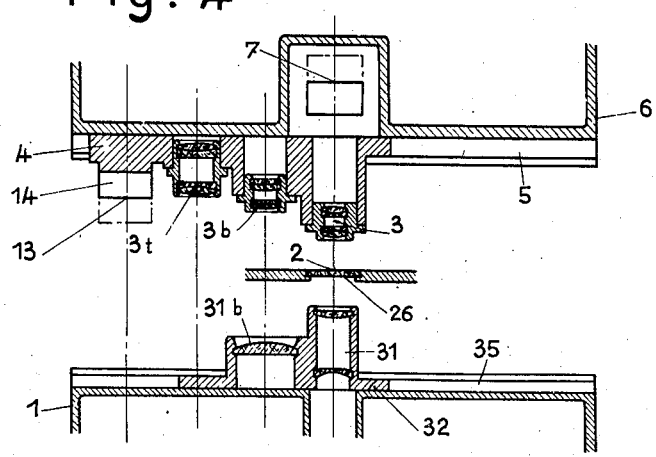
Figure 4 is a fragmentary view taken on the sectional line IV—IV of Fig. 2.

The showing of Fig. 4 illustrates a section of the sliding holder 4 along its longitudinal axis. Said holder carries the objectives 3, $3^b$, $3^t$ having relatively short frontal distances. It also carries the mirror 14 adapted to throw back the optical axis towards the objective 15 when the centre of said mirror is brought into coincidence with the axis 2—7.

It will be obvious that the runway 5 may be either rectilinear or circular. In the latter case, the holder 4 is made revoluble about an actual or a virtual axis.

In the showing of Fig. 5 is illustrated by way of example a constructional embodiment of the projection apparatus incorporating the features of the invention, the illuminating means being also shown.

In this constructional form, besides carrying the short frontal distance objectives and the mirror which throws back the optical axis towards the long frontal distance objective 15, the slider 4 also carries illuminating mirrors 21 adapted to receive the light beam which rises from an electric glow bulb 22 through condenser lenses 23, 24 and to throw said light beam back towards transparent or semi-transparent sheets 25 also carried by said slider 4 in front of the objective 3, therefore deflecting the same as an episcopic illuminating beam towards the work carrier 26, the latter being arranged as usual on crossed runways 27, 28.

The light rays reflected by the surface of the work being examined or scrutinized pass through the sheet 25 and penetrate into the objective 3 and are then reflected by the mirrors 8, 10 towards the screen 12.

Figure 6:
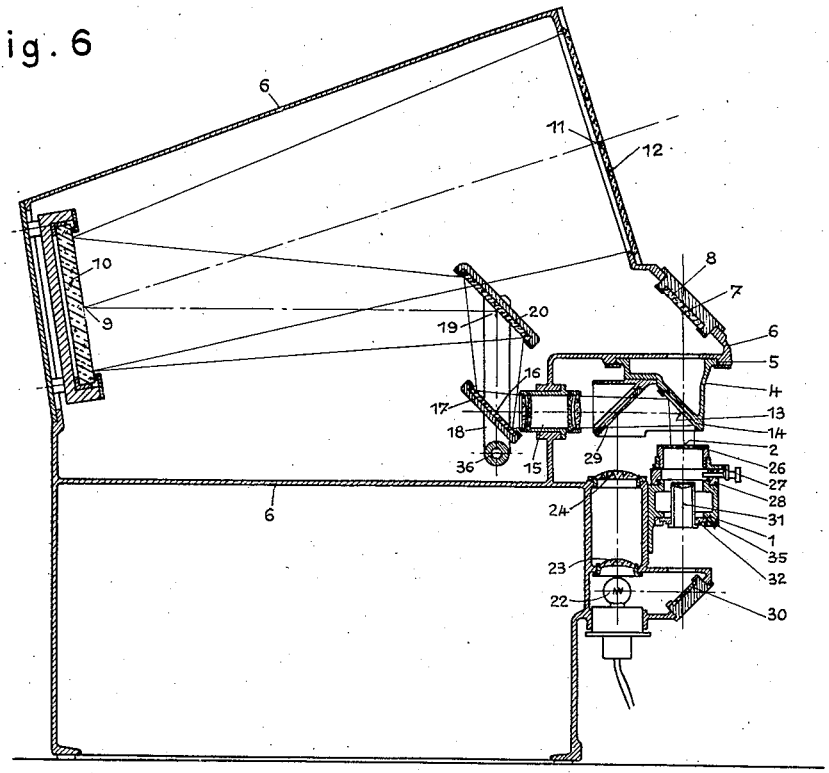
Figure 6 is a sectional view of the constructional form shown in Fig. 5 also showing the illuminating device but assuming the objective lens to have a small power of magnification.

The showing of Fig. 6 illustrates the same arrangement, assuming the long frontal distance objective 15 to be used. In this constructional form, a reflecting and transparent sheet positioned at 29 receives the light beam which rises from the electric glow bulb 22 through the condenser lenses 23, 24 and throws it back towards a mirror 14 which throws it back in turn towards the surface of the work being scrutinized. The light rays reflected by said surface are thrown back by the mirror 14 through the semi-transparent sheet 29 and into the long frontal distance objective 15. The light rays which come out of said objective 15 are thrown back by the mirrors 17, 20, 10 towards the screen 12.

In the foregoing examples, transparent or semi-transparent sheets are provided for directing the illuminating beam through the space between the light source and the work. It is, however, obvious that non-transparent mirrors may be also provided and so arranged as to allow of the passing of the beam reflected by the work towards the objectives.

Diascopic illumination may be provided by the same glow bulb 22. The beam of light emanating from said bulb is received by a mirror 30 which throws it back towards condenser lenses 31, 31ᵇ mounted on a slider 32 movable in a runway 35, whereby the centre of either condenser lens may be brought into coincidence with the illuminating beam which reaches the work carrier 26 from below, depending upon whichever of the objectives is being used at the moment under consideration.

In order to permit proper focussing of the work image projected onto the screen 12, the work carrier 26 is supported by the adjustable bracket 1 which comprises a slider arranged for being vertically moved by conventional means (not shown).

In the foregoing constructional example, one long frontal distance objective 15 is provided, said objective being held stationarily in horizontal position. Obviously, however, there may be provided two or more long frontal distance objectives held by a slider 33 movably mounted in runways 34, thereby enabling either objective selectively to be brought into operative position as shown in Fig. 7. A pair of long frontal distance objectives 15, 15ᵇ are fixed to a slider 33 which permits either of them to be brought into coincidence with the portion 13—16 of the optical axis. The slider 33 can be shifted along a runway 34 formed in the casing 6 (Fig. 8).

In the constructional modification shown in Fig. 9, one movable mirror is interposed between the screen 12 and the objectives having short frontal distance and long frontal distance respectively. The adjustable bracket 1 supports a work carrier 2. This bracket is slidably arranged on the lower front wall of the apparatus casing 6. This wall has secured thereto the illuminating means (not shown) as described with reference to Figs. 5 and 6. The upper front wall of the casing 6 includes the screen 12 which so slants rearwardly as to permit correct and easy observation of the projected image.

The movable holder 4 carries objectives (not shown) having short front distances; it also carries the reflecting surface 14. This surface throws back the beam of light from the work carrier 2 towards the long frontal distance objective 15 whose optical axis extends at an angle with that of the short frontal distance objectives.

A mirror 40 interposed between the objective 15 and the observation screen 12 directs towards said screen the beam of light from the objective 15. The mirror 40 is hinged at 43 to an adjustable setting bracket 41 pivotally carried by a pin 42 in the casing 6. An abutment 44 on the casing 6 defines the location of the setting bracket 41. A spring 45 having one of its ends abutted to the bracket 41 and its other end abutted to the lower end of the mirror pivotally urges the latter about its hinge 43 and its upper edge into contact with a top abutment 46 by means of which the angular location of the mirror is defined.

Where a short frontal distance objective carried by the adjustable bracket 4 is used, its beam of light is reflected by the mirror 8. A mere manipulation of the adjustable bracket 41 from its position shown in full lines to its position shown in chain lines permits said beam of light to be directed towards the observation screen 12 and the distance between the screen and objective to be so adjusted as to set proper optical length to suit practical requirements. In order to avoid any waste of time, a pair of abutments 47, 48 are provided so as automatically to define and secure the second position of the adjustable bracket 41 and the angular location of the mirror.

It is obvious that the abutments 44, 46, 47, 48 are positioned according to the optical characteristics of the long frontal distance and short frontal distance objectives that are used and that they may be so set as to facilitate adjustment.

As an alernative, the spring 45 may be omitted and counterweight means on the mirror 40 may be provided instead. Thus for example the weight of the mirror may be eccentric with respect to its hinge 43 as to bring said mirror automatically into contact with either of the stationary abutments 46, 47, thereby limiting the mirror stroke and sharply determining its position in proper optical accuracy.

Where several long frontal distance objectives are provided, they may be secured to a slider as above described. In such a constructional embodiment of the invention, the optical control apparatus possesses all the advantages mentioned with reference to Figs. 2 to 8 while being endowed with a better efficiency from the standpoint of illumination since the use of two mirrors can be saved. Thus by fitting the apparatus with a source of light of equal power than heretofore, a better illuminated image will be secured. Such a result is obviously quite valuable in such an optical control apparatus. Moreover, as the use of two mirrors can be dispensed with, the manufacturing cost of the apparatus can be correspondingly lessened.

Numerous minor constructional details might be changed without departing from the scope of the subjoined claims in which, as above stated, the elements of the improved apparatus are designated by general expressions.

What is claimed is:

1. An optical control apparatus comprising, intermediate a horizontal work carrier and a steeply inclined observation screen on which an image of the work is optically projected, primary lens means of short frontal distance, a supporting slider adjustable across the portion of the optical axis of projection extending upwardly from the work, secondary lens means of long frontal distance set at right angle to the primary lens means, reflecting means on said slider capable of deflecting said optical axis portion through the secondary lens means respective to adjustment of said slider into coincidence with the last-named means, a pivotal mirror adjustable across the portion of the optical axis extending between either of said lens means and the screen, pivotal setting means carrying the mirror for determining the distances between mirror and screen, a pair of abutments limiting the pivotal stroke of said mirror setting means in both directions, a second pair of abutments determining the mirror end stroke positions, and spring means urging said mirror into contact with either of the abutments of the last-mentioned pair.

2. An optical control apparatus comprising, intermediate a horizontal work carrier and a steeply inclined observation screen on which an image of the work is projected, primary lens means of short frontal distance, a supporting slider adjustable across the portion of the optical axis of projection extending upwardly from the work, secondary lens means of long frontal distance set at right angle to the primary lens means, reflecting means on said slider capable of deflecting said optical axis portion through the secondary lens means responsive to adjustment of said slider into coincidence with the last-named means, a pivotal mirror adjustable across the portion of the optical axis extending between either of said lens means and the screen, a pivotal setting bracket carrying the mirror for determining the distances between it and the screen, a pair of abutments limiting the pivotal stroke of said bracket in both directions, a second pair of abutments determining the mirror end stroke positions, and counterweight means associated with the mirror for bringing it into contact with either of the abutments of the last-mentioned pair.

3. In an apparatus for reproducing images on a screen for optical examination, the combination, including, a casing, a viewing screen thereon, a work table for supporting an object to be examined in the vertical optical axis of a main objective lens cooperating with a source of light, an image reflector supported in the front of the casing above the work table and in the field of said optical axis, a secondary objective lens supported in the casing above the work table and having its optical axis intersecting the optical axis of the main objective lens, a second image reflector at the rear of the casing for receiving an image from the secondary objective lens and reflecting it to the screen, and means for adjustably supporting said second image reflector, said means comprising, a bracket medially pivoted to the casing, means respectively for pivotally and yieldingly connecting the reflector to one end of the bracket, means on the casing for engaging the opposite ends of the bracket to limit its pivotal movement, and spaced abutments also on the casing for engaging the front and rear of the reflector when the bracket is moved to either of its limiting positions thereby to determined the angular position of the mirror relative to the screen.

4. An optical control apparatus for making observations by optical examination, including, a casing, a screen, a work carrying table, and means for reducing the distance between said screen and said table, said means comprising, in combination, a movable holder slidably supported in the casing above the work table, a plurality of image transmitting elements on said holder, a first primary mirror in the front of the casing above the holder and disposed in the path of the optical axis of a selected one of said image transmitting elements, a second primary mirror in the rear of the casing for reflecting the image from the first mirror to the screen, secondary lens means supported in the casing above the work table and below said movable holder and having its optical axis intersecting the optical axis of a selected image transmitting element, upper and lower facing mirrors mounted on a support pivoted at its lower end to the casing and swingable from a horizontal inoperative position to a vertical operative position whereby the lower mirror intercepts and reflects the image from the secondary lens means to the upper mirror which in turn reflects the image to said second mirror at the rear of the casing and thence to the screen.

5. In an optical apparatus for making observations by optical examination, according to claim 4, wherein the secondary lens means is also mounted in a shiftable holder.

6. An optical apparatus for making observations by optical examination, including, a casing, a screen, a work table, a plurality of primary image transmitting elements slidably mounted in the casing above the work table, secondary lens means mounted in the casing above the work table and below the primary image transmitting elements, said secondary lens means having its optical axis intersecting the optical axis of a selected one of the primary image transmitting elements, a first reflecting mirror in the casing and located in the field of the optical axis of a selected one of the primary image transmitting elements, a second reflecting mirror in the casing and adapted to receive an image reflected from said first mirror and reflect it to said screen, upper and lower mirrors mounted in spaced facing relation on a support pivoted at its lower end to the casing and swingable from a substantially horizontal inoperative position to a vertical operative position whereby the lower mirror is brought into the field of the optical axis of the secondary lens means thereby to reflect an image to the upper mirror which in turn reflects said image to the second mirror in the casing and from thence to said screen.

7. In an apparatus for reproducing images on a screen for optical examination from a selected one of a plurality of image sources, the combination with the screen and a pair of primary mirrors for reflecting images thereon, of a pivoted support having a pair of secondary mirrors thereon in spaced facing relation, said support being movable to a position to provide an uninterrupted path of projection between said primary mirrors and also being movable to a relatively angular position, whereby, the upper secondary mirror blocks off one of said primary mirrors and transmits an image received from the lower secondary mirror direct to the other primary mirror for reflection to said screen.

8. In an apparatus for reproducing images by optical examination, the combination, including, a work carrier, an observation screen above said carrier, primary mirrors for reflecting an image of the work onto the screen, a support adjustable across the optical axis extending from the work to the screen, primary lens means of short frontal distance and reflecting means for secondary lenses of long frontal distance carried by said support, secondary lens means of long frontal distance supported at an angle to the primary lens means, said reflecting means on the support being capable of deflecting the portion of the optical axis originating at the work through the secondary lens means when said support is adjusted to cause coincidence of the reflecting means with said axis, and secondary reflecting means disposable across the path of the optical axis from the secondary lens means to one of the primary mirrors.

FERNAND TURRETTINI.